US008214335B2

(12) United States Patent
Hamilton, II et al.

(10) Patent No.: US 8,214,335 B2
(45) Date of Patent: *Jul. 3, 2012

(54) CONTROLLING AND USING VIRTUAL UNIVERSE WISH LISTS

(75) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,417

(22) Filed: Jun. 3, 2010

(65) Prior Publication Data

US 2011/0010270 A1    Jan. 13, 2011

Related U.S. Application Data

(62) Division of application No. 11/871,490, filed on Oct. 12, 2007, now Pat. No. 7,792,801.

(51) Int. Cl.
*G06F 17/30* (2006.01)
(52) U.S. Cl. .................. 707/655; 707/803; 715/757
(58) Field of Classification Search ............ 707/655, 707/757, 803, 999.006, 620, 805; 715/757; 709/216
See application file for complete search history.

(56) References Cited

U.S. PATENT DOCUMENTS

| 6,421,047 | B1 | 7/2002 | de Groot | |
|---|---|---|---|---|
| 6,476,830 | B1* | 11/2002 | Farmer et al. | 715/769 |
| 6,694,357 | B1 | 2/2004 | Volnak | |
| 6,767,287 | B1* | 7/2004 | Mcquaid et al. | 463/42 |
| 7,222,160 | B2* | 5/2007 | Hlasny | 709/217 |
| 7,711,533 | B2* | 5/2010 | Wilensky et al. | 703/13 |
| 2007/0255710 | A1 | 11/2007 | Kagaya | |
| 2008/0307066 | A1* | 12/2008 | Amidon et al. | 709/217 |
| 2009/0100076 | A1 | 4/2009 | Hamilton, II et al. | |
| 2009/0106671 | A1* | 4/2009 | Olson et al. | 715/757 |
| 2009/0113314 | A1* | 4/2009 | Dawson et al. | 715/757 |
| 2009/0199095 | A1* | 8/2009 | Nicol et al. | 715/704 |
| 2010/0058208 | A1* | 3/2010 | Finn et al. | 715/764 |

OTHER PUBLICATIONS

"Features", *Entropia Universe*. http://www.entropiauniverse.com/en/rich/5357.html (Obtained from the Internet on Oct. 12, 2007), 4 pages.

(Continued)

*Primary Examiner* — Marc Filipczyk
(74) *Attorney, Agent, or Firm* — DeLizio Gilliam, PLLC

(57) ABSTRACT

Described herein are processes and devices that control and use virtual universe wish lists. One of the devices described is a virtual wish list device. The virtual wish list device determines an item in a virtual universe that is a desired by an avatar. The virtual wish list device designates the item as a desired item in a wish list. The wish list may be stored in the avatar's virtual universe inventory. The wish list device determines details about the desired item, such as whether the item is desired in the virtual universe or in the real world. The wish list device stores the details about the desired item in the wish list. The virtual wish list device may use the details to conduct transactions related to the desired item.

16 Claims, 7 Drawing Sheets

OTHER PUBLICATIONS

"U.S. Appl. No. 11/871,490 Notice of Allowance", May 11, 2010, 23 pages.
"U.S. Appl. No. 11/871,490 Office Action", Nov. 17, 2009, 10 pages.
"Youniversal Branding Part 1", Trendwatching.Com. http://www.trendwatching.com/trends/YOUNIVERSALBRANDING.htm (Obtained from the Internet on Oct. 12, 2007) Jul. 2006, 28 pages.
Wikipedia Contributors, , "Virtual economy", http://en.wikipedia.org/w/index.php?title=Virtual_economy&oldid=163944627 (Obtained from the Internet on Oct. 12, 2007) Wikipedia, The Free Encyclopedia Oct. 12, 2007, 4 pages.

* cited by examiner

CONTROLLING AND USING VIRTUAL UNIVERSE WISH LISTS

RELATED APPLICATIONS

This application claims the priority benefit of U.S. application Ser. No. 11/871,490 filed Oct. 12, 2007.

BACKGROUND

1. Technical Field

Embodiments of the inventive subject matter relate generally to virtual universe systems, and more particularly to controlling and using virtual universe wish lists.

2. Background Art

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include "metaverses" and "3D Internet."

SUMMARY

Described herein are processes and devices that control and use virtual universe wish lists. One of the devices described is a virtual wish list device. The virtual wish list device determines an item in a virtual universe that is a desired by an avatar. The virtual wish list device designates the item as a desired item in a wish list. The wish list may be stored in the avatar's virtual universe inventory. The wish list device determines details about the desired item, such as whether the item is desired in the virtual universe or in the real world. The wish list device stores the details about the desired item in the wish list. The virtual wish list device may use the details to conduct transactions related to the desired item.

BRIEF DESCRIPTION OF THE FIGURES

The present embodiments may be better understood, and numerous objects, features, and advantages made apparent to those skilled in the art by referencing the accompanying drawings.

DESCRIPTION OF ILLUSTRATIVE EMBODIMENTS

The description that follows includes exemplary systems, methods, techniques, instruction sequences and computer program products that embody techniques of embodiments of the invention(s). However, it is understood that the described embodiments of the invention(s) may be practiced without these specific details. For instance, although examples refer to storing item details in a wish list in the virtual universe, such as on virtual universe servers, other examples may store item details outside of the virtual universe, such as on client devices. In other instances, well-known instruction instances, protocols, structures and techniques have not been shown in detail in order not to obfuscate the description.

Introduction

Figure 1:
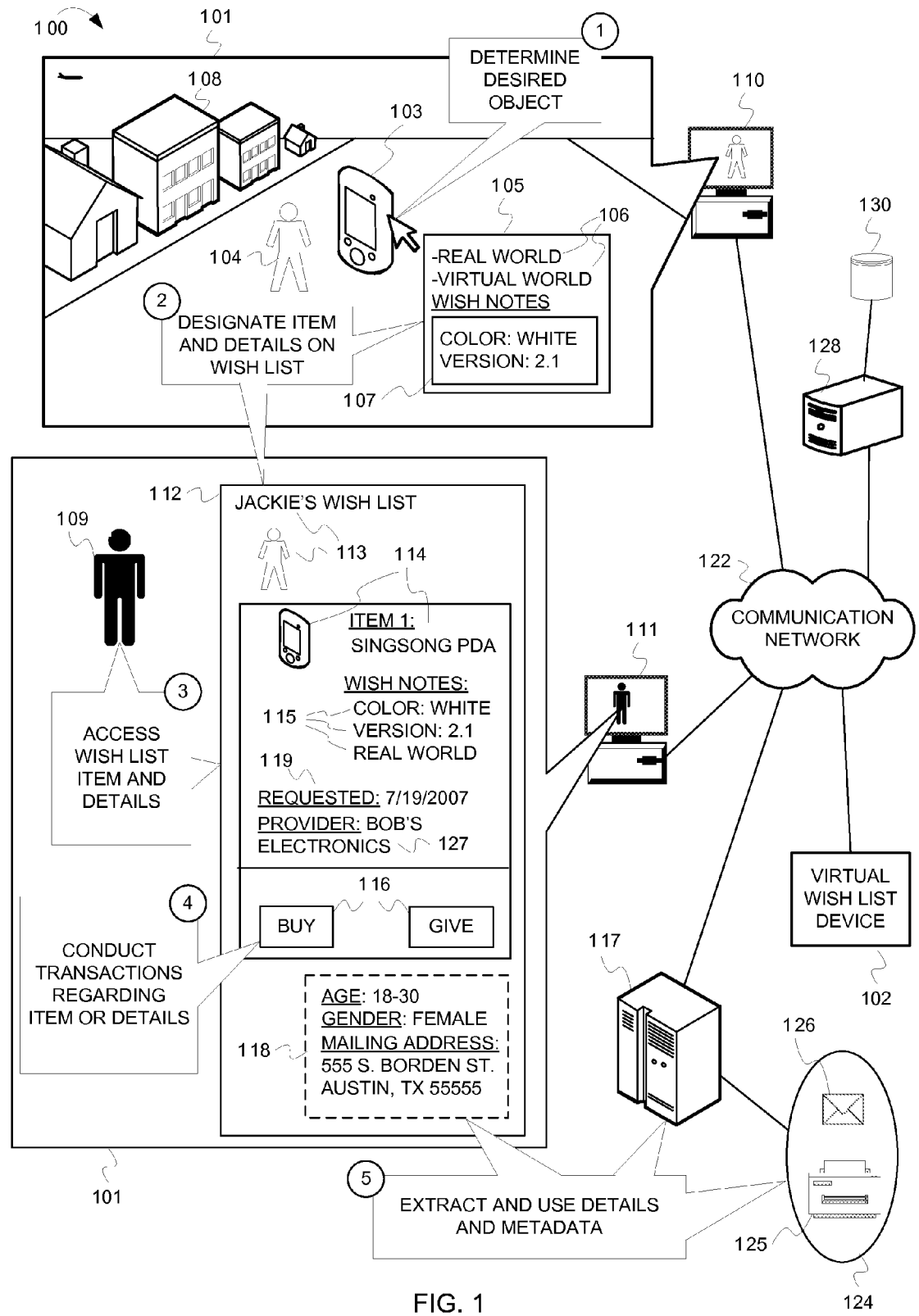
FIG. 1 is an illustration of an example virtual wish list device 102 within an operating environment 100.

VU environments have become increasingly popular for all types of entertainment and commerce. Avatars in the VU represent agents, or real life users, with desires for items and services. A VU user's avatar may spend a good deal of time residing in the VU. Consequently, a VU could greatly benefit from devices that would assist the VU avatars to track their desires for items and services without having to leave the VU. However, conventional VU's lack automated abilities to allow users to express desires, or wishes, for goods and services from within a virtual universe, and to obtain those goods and services. FIG. 1 shows how a virtual wish list device may work within a VU to create and control virtual wish lists.

FIG. 1 is an illustration of an example virtual wish list device 102 within an operating environment 100. In FIG. 1, a virtual wish list device 102 is connected to a communication network 122. Also connected to the communication network 122 are one or more client devices 110, 111 configured to provide access to a virtual universe 101. A server 128 is also connected to the communication network 122. In this illustration, the server 128 hosts the virtual universe 101. A database 130 is connected to the server 128. The database 130 stores information about virtual universe inventories, wish lists, etc. Of course, the information may be stored on the server 128, and perhaps servers in addition to or instead of a standalone database.

The virtual universe 101 includes various graphical objects 108 (e.g., buildings, avatars, vehicles, etc.) that make up the virtual universe 101. One such graphical object includes a virtual item 103. A virtual item, for example, includes any object in the virtual universe that has a universally unique identifier (UUID). The virtual item 103 is an item that an avatar 104, representing a user account, agent, inhabitant, or resident, desires to possess. The avatar 104 may desire to possess the item in different ways. For example, the avatar 104 may desire to possess the actual object displayed in the virtual universe 101 that comprises the virtual item 103. Alternatively, the avatar 104 may desire to possess a copy of the virtual item 103 in the virtual universe 101. Further, the avatar 104 may desire to possess a real-world item that the virtual item 103 represents.

The virtual wish list device 102, in stage "1", determines that the item 103 is desired by the avatar 104. For example, the virtual wish list device 102 detects when the avatar 104 selects the virtual item 103. The virtual wish list device 102 processes an operation, initiated by the avatar 104, such as a mouse right-click operation, to present an options screen 105. The virtual wish list device 102 recognizes when the avatar 104 selects an option 106 on the options screen 105. By selecting the option 106, the avatar 104 indicates a desire to place information, or details, about the virtual item 103 on a virtual wish list 112. The virtual wish list device 102 also presents a box 107 for the avatar 104 to notate something specific that is desired. For example, the avatar 104 may notate desired characteristics (e.g., color, type, etc.) about the virtual item 103 or desired characteristics that are different from the virtual item 103. For another example, if the virtual item 103 is representative of a real-world item, the avatar 104 may notate the desired or undesired characteristics (e.g., condition, age, tax, shipping details, etc.) about the real-world item represented by the virtual item 103.

The virtual wish list device 102, in stage "2", designates the virtual item 103 on a virtual wish list 112. The virtual wish list device 102 may create the wish list 112 and display it in a virtual inventory of the avatar 104. The virtual wish list device 102 designates the virtual item 103, for example, by recording on the wish list 112 details about the virtual item 103, the avatar 104, and the operating environment 100. Details about the virtual item 103 may include information 114 that identifies the virtual item 103 as well as information 115 that the avatar 104 specifies or notates about the virtual item 103. Details about the avatar 104 may include information 113, such as an image of the avatar and the avatar's name, or even metadata 118 (e.g., demographics, and address, etc.) specifically referring to the agent associated with the avatar 104. The metadata 118 may be hidden from view on the virtual wish list 112 as depicted in FIG. 1, but still is available for extraction from the virtual wish list 112. Details about the operating environment 100 may include information 119, which indicates the date that the virtual wish list device 102 designated the virtual item 103 in the virtual wish list 112. Other examples of operating environment information include indication of any security violations around the time the virtual item 103 was designated in the virtual wish list 112, geographic location of the virtual wish list device 102, the date that the virtual wish list device 102 will automatically remove the virtual item 103 from the virtual wish list 112, etc.

Designating the virtual item 103 may also include analyzing the virtual universe 101 for details that may pertain to the virtual item 103. For example, the virtual wish list device 102 could read from the database 130 to obtain details that had been previously stored about the virtual item 103, such as a manufacturer of the virtual item 103. The virtual wish list device 102 may then analyze the details from the database 130, for example, to and search for and provide a location link 127 to a merchant that offers for sale instances of the virtual item 103, or other items made by the manufacturer.

The virtual wish list device 102, in stage "3", accesses the virtual wish list 112 for item details. For example, a second avatar 109 that is interested in viewing the first avatar's 104 desired items could view the wish list 112 within the virtual universe 101 using a client device 111. The virtual wish list device 102 could provide access to the second avatar 109 and other avatars and user accounts that the first avatar 104 authorizes to view the wish list 112.

The virtual wish list device 102, in stage "4", conducts transactions regarding the item or details. For example, the virtual wish list device 102 could transport the second avatar 109 to the location of a merchant, such as by selecting the location link 127. Further, the virtual wish list device 102 may present buttons 116 that allow the second avatar 109 to buy an instance of the item from the merchant. The avatar 109 can then give the purchased instance of the item to first avatar 104.

The virtual wish list device 102, in stage "5", extracts and uses details and metadata available from the virtual wish list 112. For example, a virtual wish list device 102 mines details from the virtual wish list 112, or other wish lists stored in the server 128 or database 130. The virtual wish list device 102 provides the details to a subscribed computer 117. The virtual wish list device 102 analyzes the data for various purposes, such as for marketing or market research. For instance, the virtual wish list device 102 can analyze the metadata and/or details of a particular item designated in multiple wish lists to determine a number of avatars that desire the item, popularity of variable characteristics of the item, etc. As another example, the virtual wish list device 102 could generate an electronic coupon or voucher for the virtual item 103 and attach it to an email message 126. The virtual wish list device 102 could print coupons and vouchers with a printer 125. The virtual wish list device 102 could send the electronic coupons or vouchers to the first avatar 104, the second avatar 109, or to agents associated with the avatars 104, 109.

Example Operating Environments

This section describes example operating environments and networks and presents structural aspects of some embodiments. More specifically, this section includes discussion about virtual wish list device operating environments and virtual wish list device architectures.

Example of Preparing and Tracking Virtual Items for Use with Virtual Wish Lists

Figure 2:
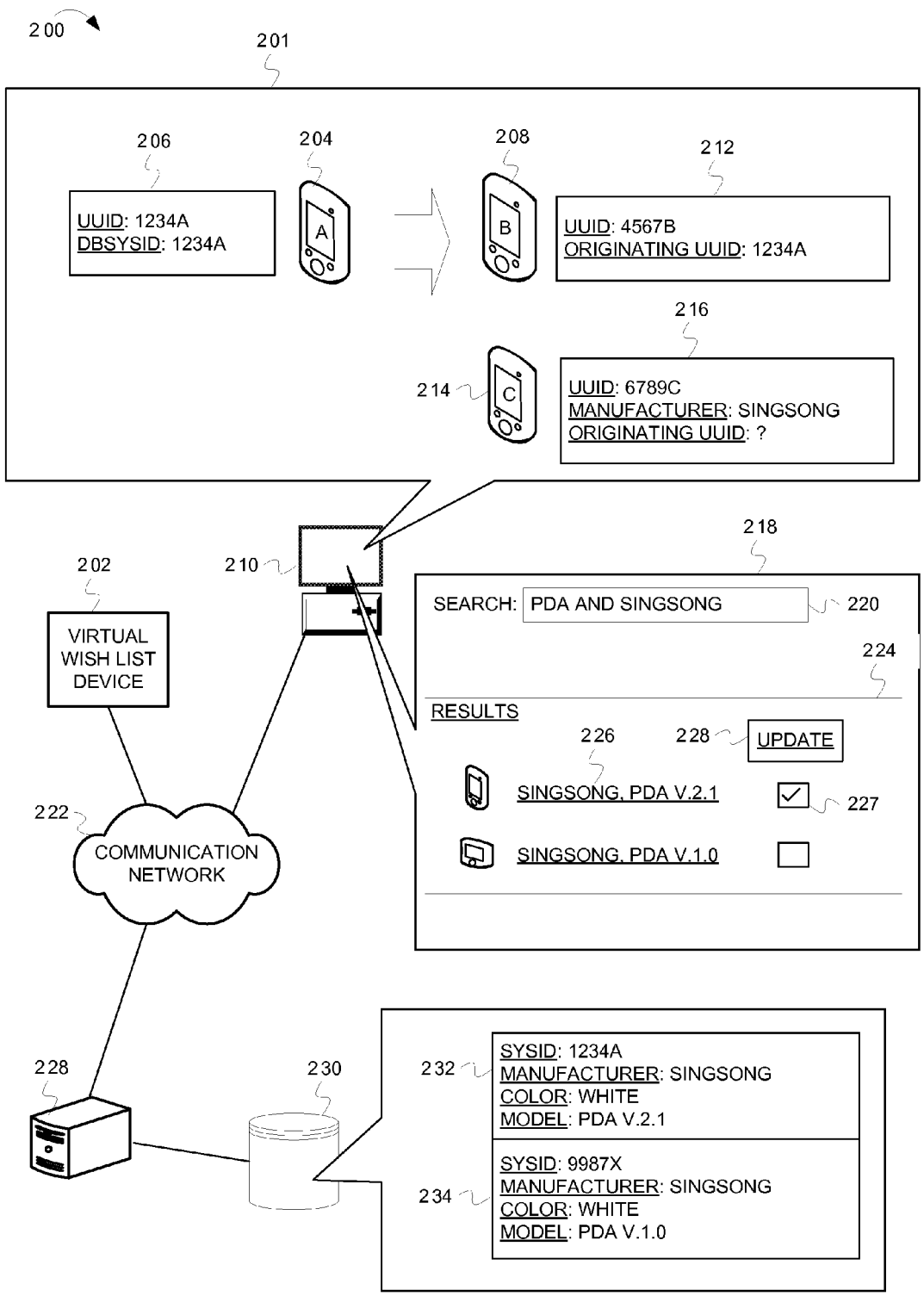
FIG. 2 is an example illustration of preparing and tracking virtual items for use with virtual wish lists.

FIG. 2 is an example illustration of preparing and tracking virtual items for use with virtual wish lists. In FIG. 2, an operating environment 200 includes a virtual wish list device 202 connected to a communication network 222. Also connected to the communication network 122 is a client device 210 configured to provide access to a virtual universe 201. A server 228 is also connected to the communication network 122. The server 228 hosts the virtual universe 101. A database 230 is connected to the server 128. The database 230 stores information about virtual universe inventories, wish lists, etc.

Within the virtual universe are one or more virtual items ("items"), item "A" 204, item "B" 208, and item "C" 214. Item A 204 represents a graphical object that has been created for use in the virtual universe, for example, a graphical representation of a portable digital assistant (PDA). Item A 204 may be utilized in the virtual universe 201 by an avatar. Item A 204 has identifying information, or details 206. These details 206 are stored in the database 230. One of the details 206 includes a universally unique identifier (UUID) to identify the item within the virtual universe 201. Item A 204 has a corresponding entry 232 in the database 230 with a unique database identification key, like a system identification number ("system ID"), to indicate the unique entry in the database 230. The system ID may match the UUID, or it may be different. The virtual wish list device 202 uses the system ID to locate the database entry and find details about item A 204, such as the manufacturer, the color, the model number, etc. The virtual wish list device 202 may clone item A 204 to create item B 208, which is an instance of item A 204. As part of the cloning process, the virtual wish list device 202 may copy a unique identification number from item A 204, such as the UUID or the system ID, and store it as details 212 related to item B 208. The virtual wish list device 202 may utilize the unique identification number of the originating object, item A 204, to search and find details pertaining to item A 204 within the database 230. Details and/or metadata about the item A 204 may also be copied into the entry 212 for item B 208 as part of the cloning process.

In some examples, however, an item exists in the virtual universe, like item C 214, which contains very few details 216. The item C 214 has a UUID, but there is no unique identifier number that may tie the cloned object back to a parent object. Consequently, the item C 214 may lack sufficient identifying information for the virtual wish list device 202 to properly designate item C 214 in a virtual wish list, or to store other details in the virtual wish list, like a location where an instance of the item could be purchased. Thus, in such an example, the virtual wish list device 202 searches the virtual universe 201, including the database 230, or other devices like the server 228, using what few details 216 it does have access to for item C 204. Further, the virtual wish list 202 may present a console 218 with a search field 220 for an agent to enter search criteria about item C 214. The virtual wish list device 202 processes the search and produces results 224. The results 224 contain a list of possible entries found in the database 230 that match the search criteria, such as entries 232 and 234 of the database 230. The virtual wish list device 202 produces links 226 that, when selected, provide additional information about the results 224. The virtual wish list device 202 selects the link 226 that most closely resembles item C 214, such as per the request of an avatar. The virtual wish list device 202 presents a selection box 227 and an update button 228, to select the proper result and update details for item C 214. Once the update button 228 is selected, the virtual wish list device 202 updates the details 216 for item C 214. In FIG. 2, the link 226 corresponds to the entry 232, which has details for the item A 204. In this example, the virtual wish list device 202 determines that the entry 232 has details for the item A 204. The virtual wish list device 202 determines that the matching entry 232 corresponds to the item A 204 (e.g., the virtual wish list device determines the UUID of the item A 204 with the SYSID in the entry 232, which happen to be the same in this example illustration). The virtual wish list device 202 then associates at least the UUID of the item A 204 with item C 214. Various techniques can be employed to associate information of different items or instances of an item. For example, the virtual wish list device 202 can augment the entry 216 with one or more fields to indicate some or all of the details of the item A 204. In another embodiment, the virtual wish list device 202 can create or update a reference in the entry 216 to the entry 232 and/or the entry 206. In FIG. 2, the virtual wish list device 202 records the determined UUID into a field "ORIGINATING UUID" of the entry 216. Updating the entry 216 allows visibility of a relationship between the item A 204 and the item C 214 for various purposes (e.g., transaction processing for item C 214, market research, data mining, etc.).

Example Virtual Wish List Device Architecture

Figure 3:
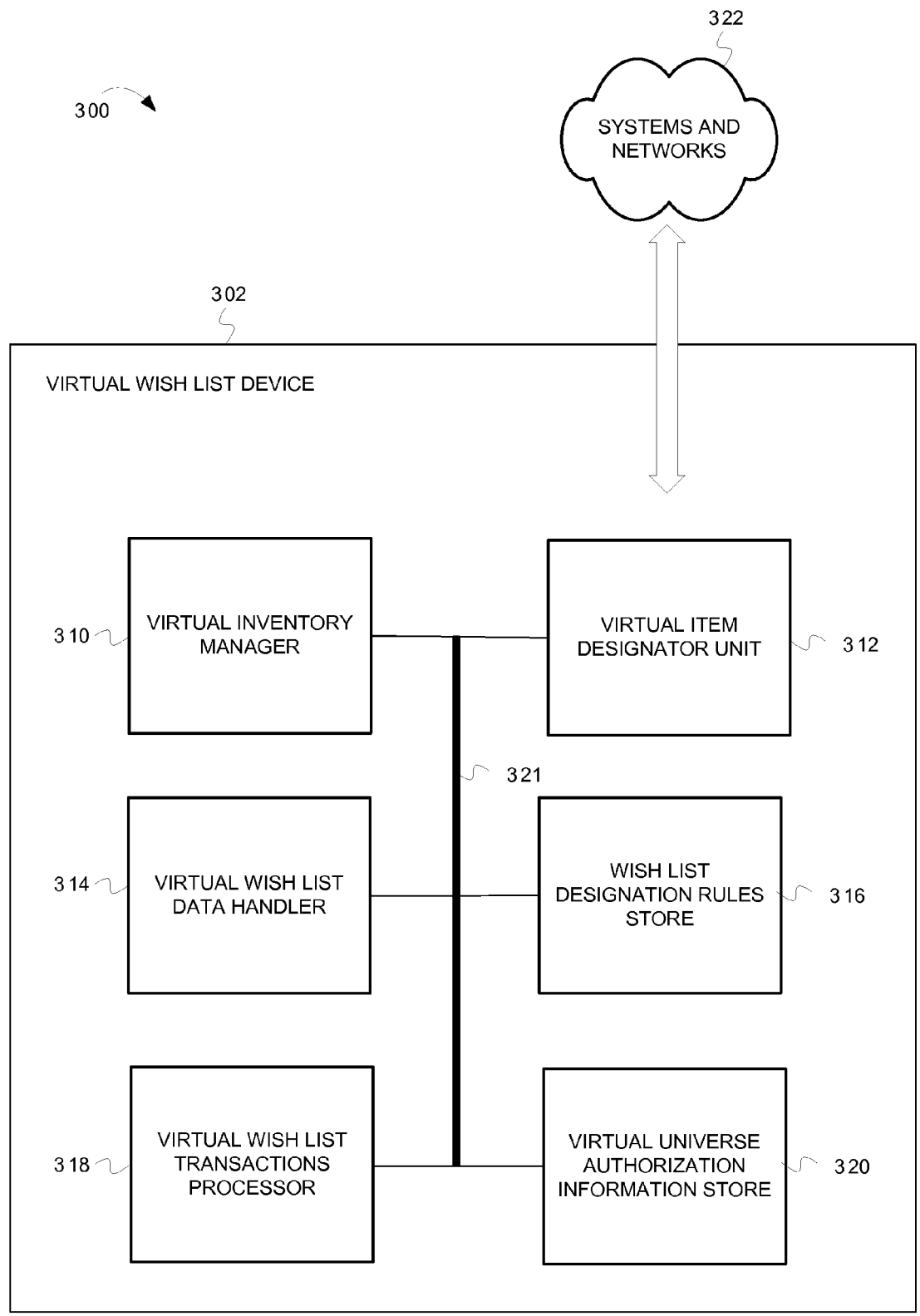
FIG. 3 is an illustration of an example virtual wish list device architecture 300.

FIG. 3 is an illustration of an example virtual wish list device architecture 300. In FIG. 3, the virtual wish list device architecture 300 includes a virtual wish list device 302 configured to interface with systems and networks 322.

The virtual wish list device architecture 300 may include a virtual inventory manager 310 to manage wish list information within an avatar's inventory. The virtual inventory manager 310 may also control the location and movement of wish list items as they are purchased and transferred. The virtual inventory manager 310 may access virtual wish lists in virtual inventories to access details about desired items on the wish lists.

The virtual wish list device architecture 300 includes a virtual item designator unit 312 configured to designate items in virtual wish lists. The virtual item designator unit 312 may select desired items and store identifying information about the virtual items on a virtual wish list. The virtual item designator unit 312 may also create virtual wish lists and place them where an avatar or agent may access it, such as in the avatar's virtual inventory.

The virtual wish list device architecture 300 includes a virtual wish list data handler 314 configured to determine details about designated items. The virtual wish list data handler 314 may analyze network devices, such as databases, to extract details to be used for designation and processing. The virtual wish list data handler 314 may also receive specified and notated details, provided by an avatar, and store those details on a virtual wish list.

The virtual wish list device architecture 300 also includes a wish list designation rules store 316 configured to store rules regarding designation of items in a wish list in a virtual universe.

The virtual wish list device architecture 300 includes a virtual wish list transactions processor 318 configured to process transactions using details about designated items. The virtual wish list transactions processor 318 may process transactions using details stored on a virtual wish list. Examples of transactions include moving items and avatars, purchasing items and gifting them, generating coupons, etc.

The virtual wish list device architecture 300 further includes a virtual universe authorization information store 320 configured to access and control virtual universe accounts. For example, the virtual universe authorization information store 320 may provide account identifiers that authorize access to virtual wish lists. The virtual universe authorization information store 320 may store account settings that indicate which avatars, accounts, businesses, etc., have access to an avatar's wish list.

Finally, the virtual wish list device architecture 300 includes a communication interface 321 configured to facilitate communication between the components of the virtual wish list device 302.

Each component shown in the virtual wish list device architecture 300 is shown as a separate and distinct element. However, some functions performed by one component could be performed by other components. For example, the virtual item designator unit 312 could also analyze and determine details about a virtual item similar to the virtual wish list data handler 314. Further, the components shown may all be contained in the virtual wish list device 302, but some, or all, may be included in, or performed by, other devices on the systems and networks 322. In addition, the virtual wish list device architecture 300 may be implemented as software, hardware, any combination thereof, or other forms of embodiments not listed.

Example Operations

This section describes operations associated with some embodiments of the invention. In the discussion below, the flow diagrams will be described with reference to the block diagrams presented above. However, in some embodiments, the operations may be performed by logic not described in the block diagrams.

In certain embodiments, the operations may be performed by executing instructions residing on machine-readable media (e.g., software), while in other embodiments, the operations may be performed by hardware and/or other logic (e.g., firmware). Moreover, some embodiments may perform less than all the operations shown in any flow diagram.

Figure 4:
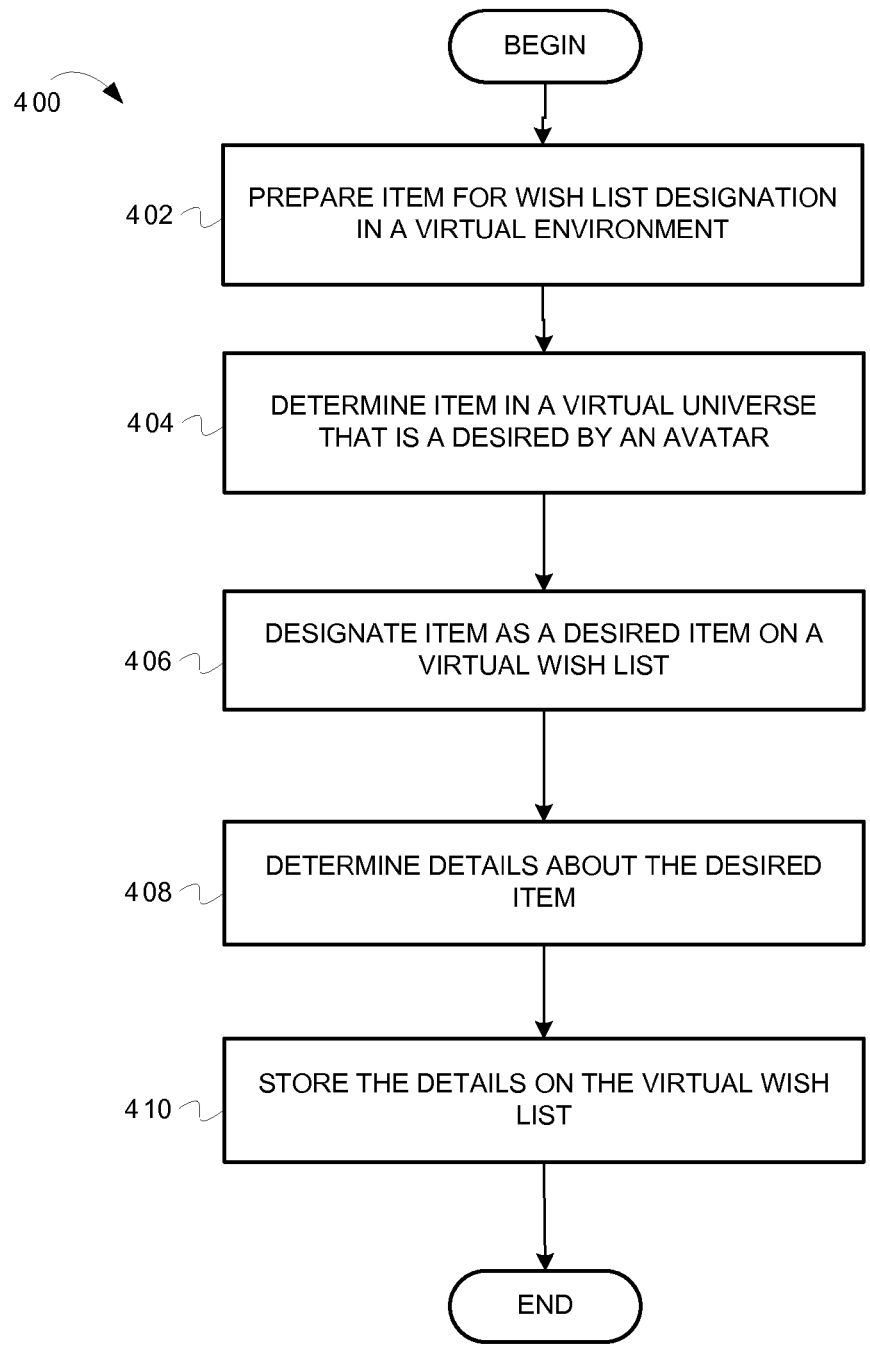
FIG. 4 is an example flow diagram 400 illustrating controlling virtual items in a virtual wish list.

FIG. 4 is an example flow diagram illustrating controlling virtual items in a virtual wish list. In FIG. 4, the flow 400 begins at processing block 402, where a virtual wish list device prepares an item for wish list designation in a virtual universe. One example of preparing an item may include assigning details to the item when it is first created in the virtual universe. Details include identifying information about the item, such as a universally unique identifier (UUID), a manufacturer name for an item, a creation date, information about the item's virtual characteristics like color, size, location, etc. Thus, the virtual wish list device may clone the item by copying details from the original item and assigning them to the cloned item. The virtual wish list device uses those details in conjunction with wish lists. When the virtual wish list device clones an item, it creates a new UUID, but also copies the original UUID and stores the original UUID as a detail on the cloned item. Consequently, the virtual wish list device may look up the original item using the original UUID and obtain details when necessary. In cases where a cloned item already exists in a virtual universe without a reference back to an original UUID, the virtual wish list device determines information about the cloned item, then searches the virtual universe to find details about the original item. Further, the virtual wish list device determines information about the cloned item by analyzing the cloned item, such as to determine characteristics about the item. The virtual wish list device also receives details about the item from an observer, such as from an avatar or agent that describes the item's characteristics as search criteria. The virtual wish list uses the search criteria to search virtual universe databases, or any other network devices that might contain information on items. Once the virtual wish list device obtains details about the cloned item, such as an original UUID, a manufacturer, etc., it stores or references that information in conjunction with the item. Embodiments may also assign an indication of item type, class, and/or category to an item. This indication would carry over to clones until a clone is modified to a degree that it falls into a different category, class, or type. When an item transitions into a different item class, type, or category, and is assigned a new indication, then the previous indication may be recorded as a predecessor class (type or category) indication. Embodiments may maintain a history of predecessor indications.

The flow 400 continues at processing block 404, where the virtual wish list device determines an item in a virtual universe that is desired by an avatar. For example, a virtual wish list device determines an item in the virtual universe by selecting the item and determining that an avatar desires to place the virtual item on a virtual wish list. For instance, the virtual wish list device may detect when an avatar, a mouse pointer, etc, touches an item in the virtual universe. The virtual wish list device may not be certain why the avatar has touched the item. Therefore, the virtual wish list device could present an options screen for the avatar to indicate whether the avatar desires to place the virtual item in a wish list. The virtual wish list device recognizes that the avatar indicates a desire to place the item on the virtual wish list. Any item within the virtual universe may be a potential wish list item. For instance, a potential wish list item may be in a store, in the avatar's inventory, depicted in an advertisement, announced over a radio broadcast in a virtual universe, on another avatar or elsewhere in the virtual universe. An avatar may select items as part of normal interaction in the virtual universe. For example, an avatar may right-click on a musician and indicate that the song the musician is singing should be added to the avatar's wish list. The virtual wish list device could present a plurality of options of what the avatar desires (e.g., "desire mp3 of song?", "desire album of artist?", "desire tickets to artist's upcoming performance?", "Other?"). The virtual wish list device could also present a box for the avatar to notate something specific that is desired. Potential wish list items may be items that the avatar doesn't possess in the virtual universe or outside the virtual universe; items that the avatar already possesses in the virtual universe, but wants as a real-world copy of the item; items possessed outside of the real world but desired in the virtual universe; or items possessed in either the virtual universe or real world, of which the avatar wants another copy. Further, potential wish list items may be representations of actual items, such as a listing in an advertisement or a catalog, of a virtual item.

The flow 400 continues at processing block 406, where the virtual wish list device designates the item as a desired item in a virtual wish list. The virtual wish list device determines identifying details about the virtual item. Identifying details include any information that the virtual wish list device may later use to identify the item from the wish list, such as the item's UUID, manufacturer, size, shape, color, image, etc. The virtual wish list device stores the identifying details on the wish list. If a wish list does not exist for an avatar, the virtual wish list device may create a wish list, such as within the avatar's inventory as a list of desired items, or "wishes", that do not belong to the inventory as an actual item, but that are desired. The virtual wish list device stores the identifying details in the virtual wish list by placing the identifying details as an entry on the wish list. The virtual wish list may enumerate the item on the wish list to segregate the item from other potential items on the wish list. In other examples, the virtual wish list device could store the wish list in other places other than the avatar's inventory, such as a separate list available to the avatar. In yet other examples, the virtual wish list could store the wish list outside of the virtual universe (e.g., in a file format that a client application can read and/or modify, on a web server that tracks wish list items, etc.).

The flow 400 continues at processing block 408, where the virtual wish list device determines details about the desired item. For example, the virtual wish list device displays an option screen to the avatar to notate details about the avatar's wish or desire to possess the item. For example, the virtual wish list device captures details entered by the avatar about whether the item is desired in the virtual universe, as a virtual item, or in the real world, as an actual item. The virtual wish list device captures other details that the avatar notates about what is desired, such as characteristics of the desired item, like color, type, description, etc. The virtual wish list device receives the notated details and stores the notated details along with the identifying details on the wish list. Notated details may include a degree, or ranking, of desirability, such as to what degree an avatar desires the item over other possible items on the wish list. Notated details may also include specifying specifics about the desired item that are not easily ascertainable. For example, a first avatar might select a body part on a second avatar, such as the second avatar's hair. However, only selecting the item does not provide enough detail for the virtual wish list device to be clear about the first avatar desire about the hair, so the first avatar would have to clarify the desire with notes (e.g. wants the same hair style for the avatar, wants the same hair color for the avatar, wants a similar haircut in real world, etc.) Notated details may also include categories for the item as well as a set price that an avatar is willing to pay for the item and a quantity of an item. Noted details may also include contact information, such as a shipping address. In addition to determining notated details, the virtual wish list device may also analyze the virtual item to determine non-notated details, such as characteristics or categories of the item. Further, the virtual wish list device may automatically determine system details. System details could include the date that an item is designated or details about the avatar, its associated user account, or any other information available to the virtual wish list device through the virtual universe network. Further, the virtual wish list may determine item account details, such as information stored in a database entry that is related to the item. For example, when the virtual wish list device prepared the item, it determined item details and stored them in a database. Thus, the virtual wish list device may refer to the database entry for the item to determine additional details about the item. The virtual wish list could reference an item's entry in the database by referencing the original UUID. Further, the virtual wish list device determines information about where to obtain the item. For instance, a manufacturer of the item may include a virtual "landmark" as part of the item details to specify coordinates in the virtual universe where the item may be purchased. The virtual wish list device may obtain information about the avatar's past history that could relate to the item. For example, the virtual wish list device could analyze an avatar's purchasing history or association with manufacturers and sellers that might offer the item for sale. As a result, the virtual wish list device could utilize the historical information to direct the avatar, or others, to a provider of the item.

The flow 400 continues at processing block 410, where the virtual wish list device stores the details on the virtual wish list. The virtual wish list device stores the details in the wish list along with identifying information about the item. The virtual wish list device stores some of the information to be viewable by the avatar or by other parties. Thus, a virtual wish list device may assign access rights to others and indicate which details are viewable by specific other avatars, user accounts, companies and businesses, etc. The virtual wish list device may also arrange the item in the wish list according to the details. For example, the virtual wish list device arranges the items according to the date the item was designated. It may also separate the wish list items by category or by degrees of desirability. Further, the virtual wish list device shows some details on a wish list, but hides other details as metadata that may be mined for marketing or other commercial use.

In some embodiments, the operations may be performed in series, while in other embodiments, one or more of the operations may be performed in parallel. For example designating an item, as in block 406, could be performed in parallel with determining details about the item, as in block 408.

Figure 5:
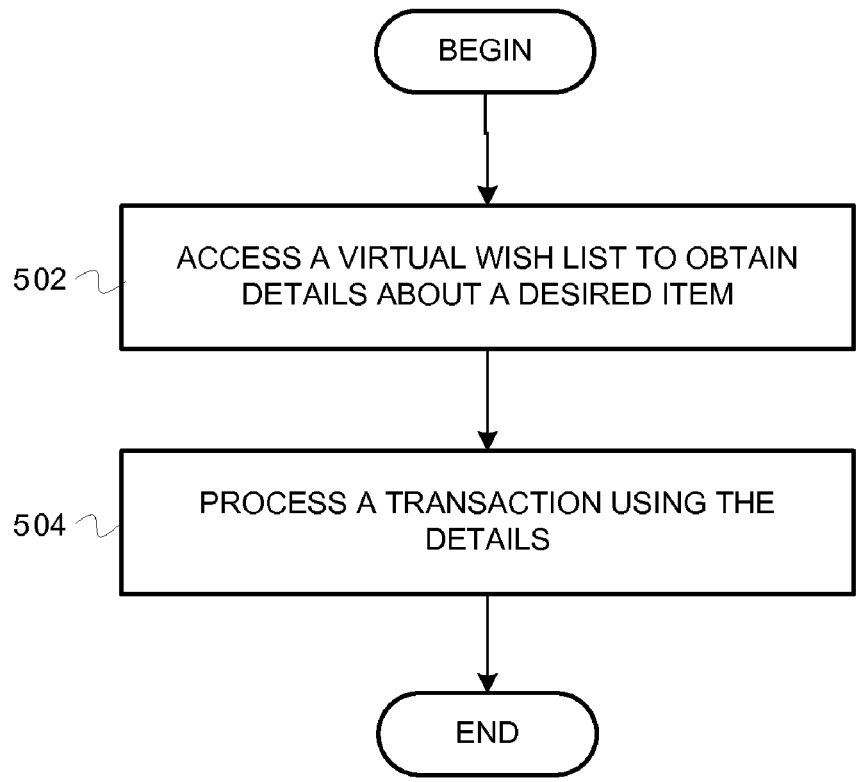
FIG. 5 is an example flow diagram 500 illustrating using virtual wish list details.

FIG. 5 is an example flow diagram illustrating using virtual wish list details. In FIG. 5, the flow 500 begins at processing block 502, where a virtual wish list device accesses a virtual wish list to obtain details about a desired item. A virtual wish list device can access a wish list in different ways. In one example, the virtual wish list device accesses a database which stores details about the wish list. In another example, a virtual wish list device sends a notification message of an entry on a wish list to an avatar's friend. The notification message includes details, such as a virtual landmark indicating a location, or coordinates in the virtual universe, where the item may be purchased, or a teleport link to the item's location. The message could contain other details that identify the item, and include the avatars notes about the item. The virtual wish list device could place the message directly into a second avatar's inventory. Further, the virtual wish list device provides access to user accounts, including company accounts for companies that want to access details about wish list items. Further, the virtual wish list may determine other avatars that own clones of the desired item and provide those avatars with information about the item.

The flow 500 continues at processing block 504, where the virtual wish list device processes a transaction using the details. For example, a virtual wish list device selects an item on the wish list. The item has location information, such as coordinates in the virtual universe, where a copy of the virtual item may be purchased. The virtual wish list device transports an avatar to the location. The virtual wish list device conducts the purchase of the item and places the item in the purchasing avatar's inventory. The virtual wish list device then transfers the item from a purchasing avatar's inventory to the avatar's inventory who desired the item. For instance, if the purchasing avatar purchases an item based on a desiring avatar's wish list request, the wish list item has details pertaining to the desiring avatar. Hence, the virtual wish list device presents a "transfer" operation, which the purchasing avatar may select. The virtual wish list device processes the transfer operation to transfer the item from the purchasing avatar's inventory to the desiring avatar's inventory. The virtual wish list device also provides a message to the desiring avatar, which message indicates information about the purchasing avatar. If the item is desired as a real-world item outside of the virtual universe, the virtual wish list device purchases a real-world version of the virtual item and initiates the physical delivery of the real-world version. Shipping information may be obtained from the avatar's account or from details about the item on the wish list.

In another example, a virtual wish list device presents information to a merchant account or other avatar ("merchant avatar") that possesses the desired item and wishes to sell it. The virtual wish list device could convey, per the merchant avatar's request, an advertisement or a coupon to the avatar who desires the item. Alternatively, the virtual wish list device could gift the item to the avatar, per the merchant's request, and place the item in the avatar's inventory along with a note from the merchant expressing gratitude for being a valued customer. The gift of a virtual item is an excellent way of building commercial good will within the virtual universe. Likewise, the virtual wish list device may gift and initiate the delivery of items in the real world to build commercial good will outside of the virtual universe.

In yet another example, the virtual wish list device may mine data from wish lists in the virtual universe, analyze the data, and deliver the analyzed data to subscribed accounts, such as businesses. For example, the virtual wish list device gathers information from a plurality of wish lists that pertain to items a subscribed account markets or is interested in marketing. The virtual wish list device analyzes the data to provide valuable commercial services and products, such as providing market research, promoting and distributing real-world goods, and organizing product roll outs.

The virtual wish list device may also use wish list details and data for bartering items between avatars. The virtual wish list device may also transfer items from the virtual wish list into real-world wish lists. For example, an avatar may already own or possess an item in the virtual universe. However, the avatar may want to indicate on a real-world wish list that the avatar agent wants the item in the real world. Consequently, the virtual wish list device may add the item, per the avatar's request, onto a real-world wish list.

Example Virtual Wish List Device Network

Figure 6:
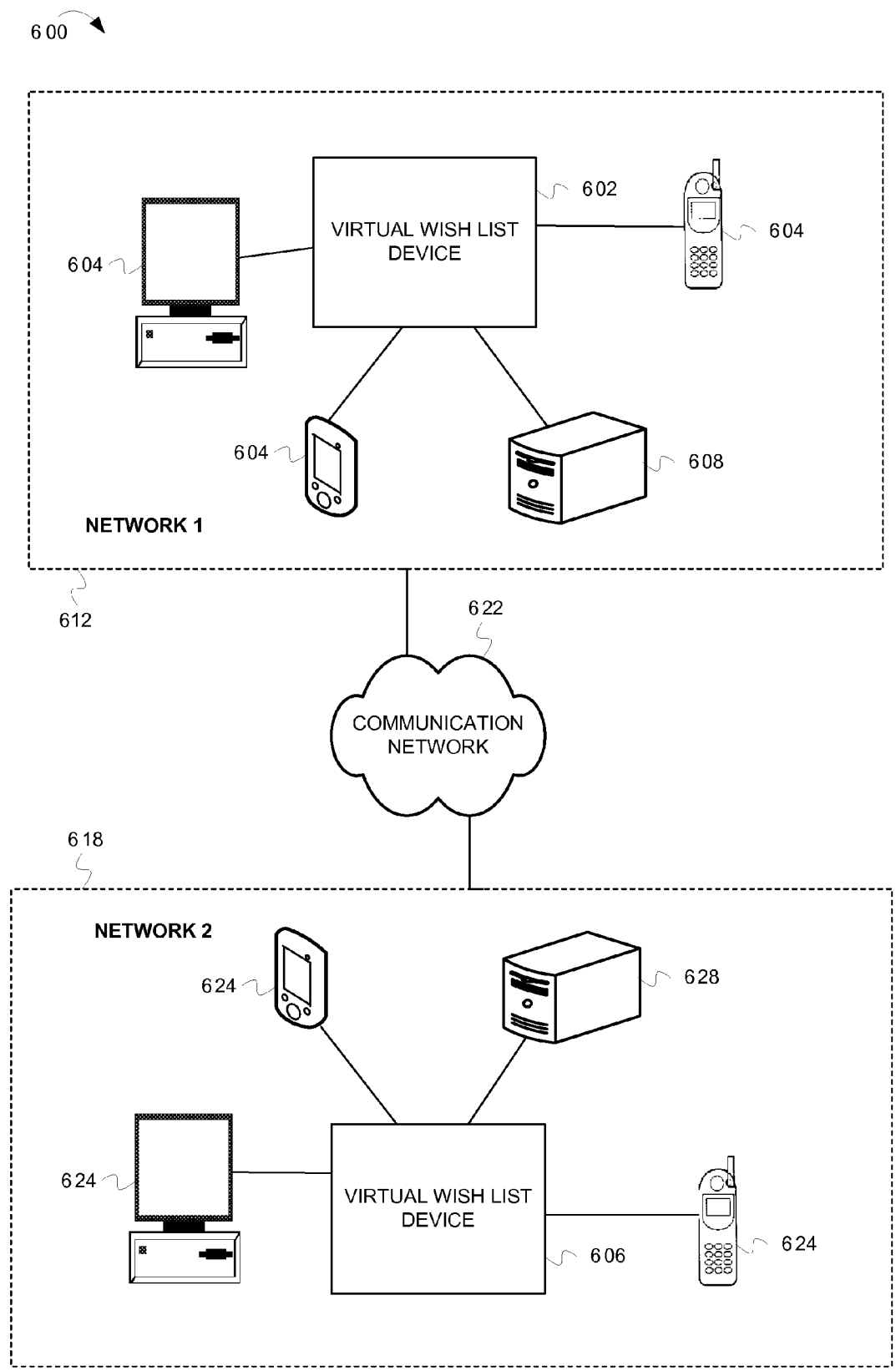
FIG. 6 is an illustration of an example virtual wish list device 602 on a network 600.

FIG. 6 is an illustration of a virtual wish list device 602 on a network 600. In FIG. 6, the network 600, also referred to as a virtual wish list device network 600, includes a first local network 612 that includes network devices 604 and 608 that may use the virtual wish list device 602. Example network devices 604 and 608 may include personal computers, personal digital assistants, mobile telephones, mainframes, minicomputers, laptops, servers, or the like. In FIG. 6, some network devices 604 may be client devices ("clients") that may work in conjunction with a server device 608 ("server"). Any one of the network clients 604 and server 608 may be embodied as the computer system described in FIG. 7. A communications network 622 connects a second local network 618 to the first local network 612. The second local network 618 also includes client 624 and a server 628 that may use a virtual wish list device 606.

Still referring to FIG. 6, the communications network 612 may be a local area network (LAN) or a wide area network (WAN). The communications network 612 may include any suitable technology, such as Public Switched Telephone Network (PSTN), Ethernet, 802.11g, SONET, etc. For simplicity, the virtual wish list device network 600 shows only six clients 604, 624 and two servers 608, 628 connected to the communications network 622. In practice, there may be a different number of clients and servers. Also, in some instances, a device may perform the functions of both a client and a server. Additionally, the clients 604, 624 may connect to the communications network 622 and exchange data with other devices in their respective networks 612, 618 or other networks (not shown). In addition, the virtual wish list devices 602 and 606 may not be standalone devices. For example, the virtual wish list device 602 may be distributed across multiple machines, perhaps including the server 608. The virtual wish list device 602 may be embodied as hardware, software, or a combination of hardware and software in a server, such as the server 608. One or both of the virtual wish list devices 602 and 606 may also be embodied in one or more client machines, possibly including one or more of the clients 604 and 624. For instance, servers may embody functionality (e.g., as code, a processing card, etc.) that searches for items that lack details so that a virtual wish list device may prepare those items for use with virtual wish lists. Functionality for designating virtual items on virtual wish lists and processing transactions using virtual wish list details may be embodied in one or more server machines or distributed as tasks to client machines accessing the virtual universe. For example, designating virtual items on wish lists may be performed as a background task on client machines distributed by servers.

Example Virtual Wish List Device Computer System

Figure 7:
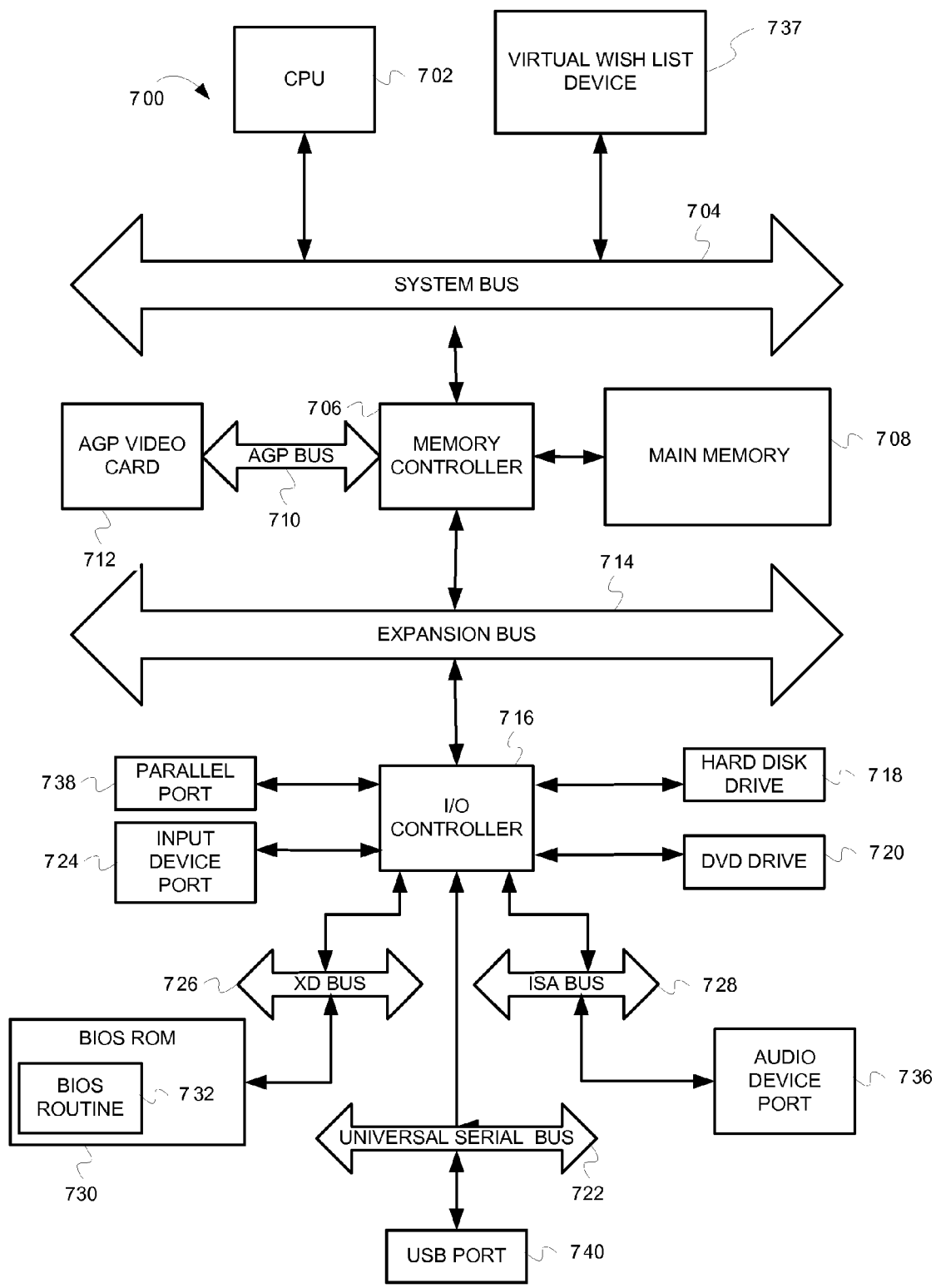
FIG. 7 is an illustration of an example virtual wish list device computer system 700.

FIG. 7 is an illustration of a virtual wish list device computer system 700. In FIG. 7, the virtual wish list device 700 ("computer system") includes a CPU 702 connected to a system bus 704. The system bus 704 is connected to a memory controller 706 (also called a north bridge), which is connected to a main memory unit 708, AGP bus 710 and AGP video card 712. The main memory unit 708 may include any suitable memory random access memory (RAM), such as synchronous dynamic RAM, extended data output RAM, etc.

In one embodiment, the computer system 700 includes a virtual wish list device 737. The virtual wish list device 737 may process communications, commands, or other information, to control and use virtual universe wish lists. The virtual wish list device 737 is shown connected to the system bus 704, however the virtual wish list device 737 could be connected to a different bus or device within the computer system 700. The virtual wish list device 737 may include software modules that utilize main memory 708. For instance, the virtual wish list device 737 may wholly or partially be embodied as a program product in the main memory 708. The virtual wish list device 737 may be embodied as logic in the CPU 702 and/or a co-processor, one of multiple cores in the CPU 702, etc.

An expansion bus 714 connects the memory controller 706 to an input/output (I/O) controller 716 (also called a south bridge). According to embodiments, the expansion bus 714 may be include a peripheral component interconnect (PCI) bus, PCIX bus, PC Card bus, CardBus, InfiniBand bus, or an industry standard architecture (ISA) bus, etc.

The I/O controller is connected to a hard disk drive (HDD) 718, digital versatile disk (DVD) 720, input device ports 724 (e.g., keyboard port, mouse port, and joystick port), parallel port 738, and a universal serial bus (USB) 722. The USB 722 is connected to a USB port 740. The I/O controller 716 is also connected to an XD bus 726 and an ISA bus 728. The ISA bus 728 is connected to an audio device port 736, while the XD bus 726 is connected to BIOS read only memory (ROM) 730.

In some embodiments, the computer system 700 may include additional peripheral devices and/or more than one of each component shown in FIG. 7. For example, in some embodiments, the computer system 700 may include multiple external multiple CPUs 702. In some embodiments, any of the components may be integrated or subdivided.

Any component of the computer system 700 may be implemented as hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments of the invention(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter may be applied to various purposes or embodiments. Although examples refer to items, services may be added to a wish list. For example, an avatar may select a salon store front to indicate a desire for a manicure or haircut. Other embodiments are included within the inventive subject matter, as logical, mechanical, electrical, and other changes may be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for gifting an instance of a virtual object in a virtual universe, the method comprising the steps of:

a computer detecting a selection of the virtual object in the virtual universe by a first avatar in response to a first user input, wherein the first avatar is controlled by a user associated with a first user account of a virtual universe computer network, wherein the virtual universe comprises a three-dimensional computer simulated environment where the first avatar represents the user as an inhabitant of the virtual universe, wherein said computer simulated environment is controlled by one or more processors in the virtual universe computer network, and wherein the selection indicates a desire by the user for the virtual object;

the computer designating the virtual object in a wish list for the first avatar in response to the step of the computer detecting the selection of the virtual object by the first avatar, wherein the wish list includes a listing of desired objects by the first avatar available from the virtual universe, and wherein the listing of desired objects are stored in a first data store unit associated with the first user account, said first data store unit accessible via the virtual universe computer network;

the computer determining, in response to the step of the computer designating of the virtual object in the wish list, that a second avatar in the virtual universe possesses the instance of the virtual object in a second data store unit associated with a second user account of the virtual universe computer network;

the computer notifying the second avatar in the virtual universe of the selection of the virtual object by the first avatar in response to the step of the computer determining that the second avatar possesses the instance of the virtual object;

the computer detecting a request by the second avatar, via second user input, to gift the instance of the virtual object to the first avatar in response to the step of the computer notifying the second avatar of the selection of the virtual object by the first avatar; and the computer transferring the instance of the virtual object from the second data store unit associated with the second avatar to the first data store unit associated with the first avatar in response to the step of the computer detecting the request by the second avatar to provide the instance of the virtual object to the first avatar.

2. The method of claim 1 further comprising the steps of:
the computer determining information about the virtual object; and
the computer storing the information about the virtual object in the wish list.

3. The method of claim 2 further comprising the step of the computer analyzing the information from the wish list to generate market research.

4. The method of claim 2 further comprising the step of:
the computer using the information for one or more of the computer determining that the second avatar possesses the instance of the virtual object, the computer notifying the second avatar of the selection of the virtual object by the first avatar, the computer detecting the request by the second avatar to gift the instance of the virtual object to the first avatar, and the computer transferring the instance of the virtual object from the second data store unit associated with the second avatar to the first data store unit associated with the first avatar.

5. The method of claim 2, wherein the step of the computer determining the information about the virtual object comprises the computer determining one or more of a universally unique identifier of the virtual object, a database identification number associated with the virtual object, a name of a manufacturer that created the virtual object, a date of designating the virtual object in the wish list, a characteristic of the virtual object, coordinates of a virtual merchant that sells a copy of the virtual object, a name of the user, an image of the first avatar, a mailing address for the user, demographic information for the user, identifying features of the virtual object, and notations made by the user regarding the virtual object.

6. The method of claim 1 further comprising the step of:
the computer determining that the first avatar is a customer of the second avatar, wherein the second avatar is a virtual universe vendor within the virtual universe, and wherein the step of the computer notifying the second avatar in the virtual universe of the selection of the virtual object by the first avatar is further in response to the step of the computer determining that the first avatar is a customer of the second avatar.

7. The method of claim 1 further comprising the steps of:
the computer sending an electronic message to a retail vendor contact outside of the virtual universe;
the computer detecting a request by the retail vendor contact to provide a voucher for a real-world version of the virtual world object to the user; and
the computer providing the retail vendor contact with a mailing address for the user so that the retail vendor contact can send the voucher to the mailing address.

8. A computer system for using a virtual wish list in a virtual universe, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to detect a selection of a virtual object in the virtual universe by a first avatar in response to a first user input, wherein the first avatar is controlled by a first user and is associated with a first user account of a virtual universe computer network;

program instructions, stored on at least one of the one or more storage devices for execution by at least one of the one or more processors via at least one of the one or more memories, to detect an indication by the first avatar of a service associated with the virtual object in response to a second user input by the first user, wherein the virtual universe comprises a three-dimensional computer simulated environment where the first avatar represents the first user as an inhabitant of the virtual universe, wherein said computer simulated environment is controlled by at least one of the one or more processors, and wherein the indication of the service associated with the virtual object indicates a desire by the first user to receive the service associated with the virtual object;

program instructions, stored on at least one of the one or more storage devices for execution by at least one of the one or more processors via at least one of the one or more memories, to store the indication of the service in a virtual wish list, wherein the virtual wish list is stored in an inventory for the first avatar, wherein the virtual wish list includes a listing of desired services by the first avatar available from the virtual universe and wherein the listing of desired services are stored in a data store unit associated with the inventory for the first avatar;

program instructions, stored on at least one of the one or more storage devices for execution by at least one of the one or more processors via at least one of the one or more memories, to detect an indication by a second avatar to view the virtual wish list subsequent to storing the indication of the service in the virtual wish list;

program instructions, stored on at least one of the one or more storage devices for execution by at least one of the one or more processors via at least one of the one or more memories, to present the indication of the service in the virtual wish list to the second avatar;

program instructions, stored on at least one of the one or more storage devices for execution by at least one of the one or more processors via at least one of the one or more memories, to detect a request by the second avatar to purchase the service for the first avatar in response to presenting the indication of the service in the virtual wish list to the second avatar;

program instructions, stored on at least one of the one or more storage devices for execution by at least one of the one or more processors via at least one of the one or more memories, to transact a purchase by the second avatar for the service in response to detecting the request by the second avatar to purchase the service for the first avatar; and program instructions, stored on at least one of the one or more storage devices for execution by at least one of the one or more processors via at least one of the one or more memories, to provide the service to the first avatar in the virtual universe in response to detecting the request by the second avatar to purchase the service for the first avatar.

9. The computer system of claim 8 further comprising:
program instructions, stored on at least one of the one or more storage devices for execution by at least one of the one or more processors via at least one of the one or more memories, to generate a voucher for the service in response to the purchase by the second avatar for the service; and program instructions, stored on at least one of the one or more storage devices for execution by at least one of the one or more processors via at least one of the one or more memories, to provide the voucher to the first avatar.

10. The computer system of claim 9 further comprising:
program instructions, stored on at least one of the one or more storage devices for execution by at least one of the one or more processors via at least one of the one or more memories, to teleport the second avatar to a location associated with a virtual vendor in the virtual universe that sells the service in response to the request by the second avatar to purchase the service.

11. The computer system of claim 10, wherein the service is redeemable by the first avatar at the location of the virtual vendor.

12. A computer program product for teleporting within a virtual universe to obtain versions of a virtual object associated with a wish list in the virtual universe, the computer program product comprising:
one or more computer-readable, tangible storage devices including a mechanism for storing information readable by a computer comprising one or more processors;

first program instructions to detect a selection of the virtual object in the virtual universe by a first avatar in response to a user input, wherein the first avatar is controlled by a user associated with a user account of a virtual universe computer network, wherein the virtual universe comprises a three-dimensional computer simulated environment where the first avatar represents the user as an inhabitant of the virtual universe, wherein said computer simulated environment is controlled by the one or more processors, and wherein the selection indicates a desire by the user for a version of the virtual object;

second program instructions to designate the virtual object in the wish list for the first avatar in response to detecting the selection of the virtual object by the first avatar, wherein the wish list includes a listing of desired objects by the first avatar available from the virtual universe, and wherein the listing of desired objects are stored in a data store unit associated with the first user account, said data store unit accessible via the virtual universe computer network;

third program instructions to notify a second avatar in the virtual universe of the selection of the virtual object by the first avatar in response to designating the virtual object in the wish list;

fourth program instructions to detect a request by the second avatar to purchase a version of the virtual object on behalf of the first avatar; and fifth program instructions to teleport the second avatar to a location in the virtual universe to purchase the version of the virtual object, is in response to detecting the request by the second avatar to purchase the version of the virtual object on behalf of the first avatar; and wherein the first, second, third, fourth, and fifth program instructions are stored on at least one of the one or more storage devices.

13. The computer program product of claim 12 further comprising:
sixth program instructions to detect a third avatar in the virtual universe that sells the version of the virtual object, wherein the third avatar is at the location in the virtual universe; and wherein the sixth program instructions are stored on at least one of the one or more storage devices.

14. The computer program product of claim 13 further comprising:
seventh program instructions to detect a purchase by the second avatar from the third avatar of the version of the virtual object, wherein the version of the virtual object is a copy of the virtual object usable by the first avatar; and eighth program instructions to transfer the copy of the virtual object to an inventory for the first avatar; and wherein the seventh and eighth program instructions are stored on at least one of the one or more storage devices.

15. The computer program product of claim 12 further comprising:
sixth program instructions to detect a third avatar in the virtual universe that sells the version of the virtual world object as a real-world product similar to the virtual object, wherein the third avatar is at the location in the virtual universe;

seventh program instructions to detect a purchase by the second avatar from the third avatar of the real-world product; and eighth program instructions to initiate transfer of the real-world product to a physical address associated with the user of the virtual universe; and wherein the sixth, seventh, and eighth program instructions are stored on at least one of the one or more storage devices.

16. The computer program product of claim 12 further comprising:
sixth program instructions to determine information about the virtual object, said information comprising one or more of identifying features of the virtual object and notations made by the user regarding the virtual object; and seventh program instructions to store the information in the wish list; and wherein the sixth and seventh program instructions are stored on the at least one of the one or more storage devices.

* * * * *